United States Patent
Thomas et al.

(10) Patent No.: US 10,963,277 B2
(45) Date of Patent: *Mar. 30, 2021

(54) NETWORK ERROR DETECTION USING VIRTUAL REALITY DISPLAY DEVICES

(71) Applicant: BANK OF AMERICA CORPORATION, Charlotte, NC (US)

(72) Inventors: James M. Thomas, Charlotte, NC (US); Alan W. Shields, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/823,589

(22) Filed: Mar. 19, 2020

(65) Prior Publication Data

US 2020/0218555 A1 Jul. 9, 2020

Related U.S. Application Data

(63) Continuation of application No. 15/916,706, filed on Mar. 9, 2018, now Pat. No. 10,620,981.

(51) Int. Cl.
*G06F 9/455* (2018.01)
*G06T 19/00* (2011.01)
(Continued)

(52) U.S. Cl.
CPC .......... *G06F 9/45533* (2013.01); *G06F 3/017* (2013.01); *G06K 9/00335* (2013.01);
(Continued)

(58) Field of Classification Search
CPC ........ G06F 9/45533; G06F 3/01; G06F 3/167; G06F 3/011; G06T 19/006; H04L 43/06; H04L 43/0823; G06K 9/00335
See application file for complete search history.

(56) References Cited

U.S. PATENT DOCUMENTS 6,073,115 A 6/2000 Marshall
6,542,249 B1 4/2003 Kofman et al.
(Continued)

OTHER PUBLICATIONS

Protectwise, "Immersive Technologies & The Future of Cybersecurity," Commissioned Research Report, https://www.protectwise.com/platform/, Oct. 24, 2017, 10 pages.
(Continued)

*Primary Examiner* — Barry Drennan
*Assistant Examiner* — Khoa Vu
(74) *Attorney, Agent, or Firm* — Michael A. Springs

(57) ABSTRACT

The device that includes a normalization engine configured to populate data fields in a normalized data structure with network information in accordance with normalization rules. The device further includes a virtualization engine configured to generate virtual data defining one or more virtual objects in accordance with virtualization rules that map data fields from the normalized data structure to physical attributes of virtual objects and to transmit the virtual data defining the one or more virtual objects for display on a user device. The virtualization engine is further configured to receive user feedback that identifies a selected virtual object, to identify data field values in the normalized data structure for the physical attributes of the selected virtual object, and to generate an error report comprising at least a portion of the identified data fields values. The virtualization engine is further configured to send the error report to the user device.

20 Claims, 2 Drawing Sheets

(51) Int. Cl.
    *H04L 12/26*     (2006.01)
    *G06K 9/00*     (2006.01)
    *G06F 3/01*     (2006.01)

(52) U.S. Cl.
    CPC ............ *G06T 19/006* (2013.01); *H04L 43/06* (2013.01); *H04L 43/0823* (2013.01)

(56) References Cited

U.S. PATENT DOCUMENTS

| | | |
|---|---|---|
| 7,853,615 B2 | 12/2010 | Liu et al. |
| 7,917,455 B1 | 3/2011 | Dobson et al. |
| 8,471,849 B1 | 6/2013 | Hickman et al. |
| 8,944,928 B2 | 2/2015 | Kaps et al. |
| 9,043,707 B2 | 5/2015 | Porwal |
| 9,110,504 B2 | 8/2015 | Lewis et al. |
| 9,183,306 B2 | 11/2015 | Robarts et al. |
| 9,516,052 B1 * | 12/2016 | Chauhan ............... H04L 43/026 |
| 2002/0188678 A1 * | 12/2002 | Edecker ............ H04L 29/12066 709/204 |
| 2008/0310707 A1 | 12/2008 | Kansal et al. |
| 2016/0103698 A1 | 4/2016 | Yang et al. |
| 2016/0219078 A1 * | 7/2016 | Porras .................... H04L 41/12 |
| 2018/0159851 A1 | 6/2018 | Ogrinz et al. |

OTHER PUBLICATIONS

Landrian Networks, Inc., "Solutions for Simple Visibility and Control," https://www.landriannetworks.com/, downloaded Feb. 9, 2018, 6 pages.

\* cited by examiner

NETWORK ERROR DETECTION USING VIRTUAL REALITY DISPLAY DEVICES

CROSS-REFERENCE TO RELATED APPLICATIONS

This application is a continuation of U.S. patent application Ser. No. 15/916,706 filed Mar. 9, 2018, by James M. Thomas et al., and entitled "Network Error Detection Using Virtual Reality Display Devices," which is incorporated herein by reference.

TECHNICAL FIELD

The present disclosure relates generally to performing network error detection using virtual objects in a virtual reality environment.

BACKGROUND

Detecting network or hardware errors in computer networks poses a technical challenge due to the large number of interconnected devices. Computer networks are made up of numerous types of devices that each offer different types of functionality. Each of these devices has their own configuration and settings. Conventional systems do not have the ability to detect errors caused by conflicting device configurations and/or settings. For example, conventional systems typically aggregate network information, process the information, and represent the network information using tables or charts. Detecting network and hardware configuration errors using tables and charts alone is not always possible because these types of data structures only provides a static view of a particular aspect of a network's configuration. Conventional systems do not have the ability to dynamically represent the network information in a way that shows how different elements of the network information (e.g. hardware configurations or settings) are related and/or interact with each other. For example, network information may be represented using a table that identifies IP addresses and data traffic, however the table representation does not indicate how this information is related to or affected by other network components.

Because conventional systems are unable to detect these kinds of errors, the network may suffer from degraded performance (e.g. data throughput or network utilization), weakened security, and other related issues. Thus, it is desirable to provide the ability to detect network errors caused by conflicting device configurations and/or settings.

SUMMARY

Computer networks are made up of numerous types of devices that each offer different types of functionality. Each of these devices has their own configuration and settings. One of the problems inherent to computer networks is the potential for conflicting hardware and/or software configurations. This problem is exacerbated by the large number of interconnected devices in a typical computer network. As the number of devices in the computer network increases the likelihood of an issue or error caused by conflicting device configurations also increases. Network errors can be caused both a single device's configuration or the combination of multiple devices interacting with each other. Thus, determining the cause and location of these types of network error poses a significant technical challenge.

Conventional systems do not have the ability to detect errors caused by conflicting device configurations and/or settings. For example, conventional systems typically aggregate network information, process the information, and represent the network information using tables or charts. Detecting network and hardware configuration errors using tables and charts is not always possible because these types of data structures only provides a static view of a particular aspect of a network's configuration. Conventional systems do not have the ability to dynamically represent the network information in a way that shows how different elements of the network information are related and/or interact with each other. For example, network information may be represented using a table that identifies IP addresses or data traffic, however a table representation does not indicate how this information is related to or affected by other network components.

In contrast to conventional systems, the network error detection system disclosed herein provides a technical solution to the problems described above by transforming network information into a new data structure represented by virtual objects that can be displayed in a virtual reality environment. This new type of data structure links network information with physical attributes of a virtual object. For example, different network information elements can be grouped together and represented as physical attributes for a virtual object. In other words, the appearance of a virtual object in a virtual reality environment is a visual representation of a combination of network elements. This feature provides a new mechanism for representing the relationships between different network information elements. Virtual objects enable the network error detection system to provide a visual representation to a user where they can quickly identify potential issues based on physical attributes of a virtual object. For example, a virtual object may stand out from other virtual objects based on its size, shape, color, etc., which may indicate to the user that there is an issue associated with the network information that was used to generate the virtual object. In this example, the user can quickly identify an issue and request the network information related to the virtual object for further troubleshooting and diagnosing.

Another feature provided by the network error detection system is that generated virtual objects are configured to interact with other virtual objects within a virtual reality environment. The network error detection system provides an unconventional solution that allows network and/or hardware configuration errors to be detected based on how the virtual objects interact with each other within the virtual reality environment. For example, the network error detection system may be configured to show data traffic using cars as virtual objects that are traveling across a highway in a virtual reality environment. In this example, the virtual reality environment may have a virtual object shown as wall blocking the highway and preventing the cars from moving across the highway. Here, the wall is a virtual object representing a port or firewall configuration. In this example, a user can quickly identify an issue (e.g. a bottleneck or data traffic blockage) caused by the wall preventing the flow of data traffic. The user can then request the network information associated with the wall to recover the port or firewall settings that are causing an error. This information can be used to resolve the issue and improve the operation of the computer network. Unlike conventional systems, the network error detection system uses virtual objects and the virtual reality environment to provide a wholistic view of a computer network and to dynamically represent network information in a way that shows how different elements of the network information are related and/or interact with each other.

The present embodiment presents several technical advantages. In one embodiment, the network error detection system improves the operation of the computer network by generating a new data structure using virtual objects where the physical attributes of the virtual objects correspond with different network information elements. A virtual object represents both how different network information elements are related to each other (i.e. the physical attributes of the virtual object) as well as how the network information elements are affected by other network information elements (i.e. other virtual objects). Conventional data structures (e.g. tables or charts) are unable to represent these types of relationships. The network error detection system uses virtual objects to group and present network information to a user in a way that allows the user to intuitively locate and identify potential issues in the computer network based on what they see in the virtual reality environment. The network error detection system enables issues to be detected based on the physical attributes of virtual objects as well as how virtual objects interact with other virtual objects within a virtual reality environment.

Another technical advantage is provided by the network error detection system's ability to maintain the relationship between network information and virtual objects to provide information about detected network errors. In other words, the network error detection system is configured such that the network information used to create a virtual object can be recovered. This feature allows network information to be recovered for troubleshooting or diagnosis issues in the computer network. For example, the network error detection system may receive user feedback from a user that identifies one or more virtual objects associated with a network error. The network error detection system is able to recover and provide the original network information that was used to generate the one or more virtual objects for troubleshooting an issue. Here, the network error detection system improves the operation of the system by providing the ability to extract information related to a network error that was identified using the virtual objects.

The features described above provide a technical solution to the problems inherent to locating and detecting errors in a computer network. Using virtual objects in a virtual reality environment, the network error detections system enables the ability to detect errors caused by conflicting device configurations and/or settings. In addition, the network error detection system improves the operation of the computer network by providing a mechanism that not only enables network issues to be located, but also enables any network information related to the issue can also be quickly recovered. The recovered network information can be used to troubleshoot and resolve any identified issues. The ability to efficiently locate and resolve issues further improves the operation of the computer network by removing bottlenecks and/or other issues that degrade the performance of the computer network.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
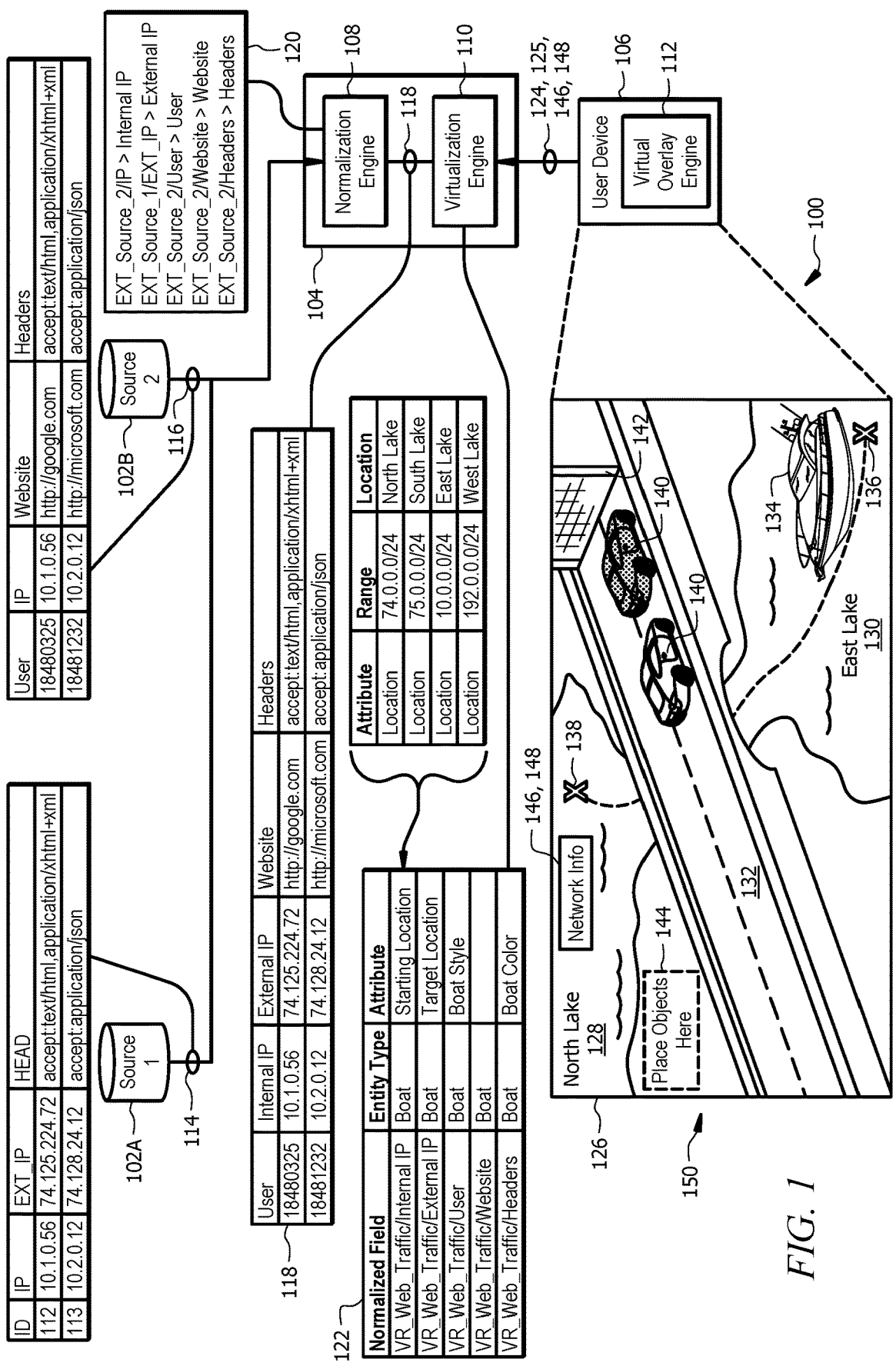
FIG. 1 is a schematic diagram of an embodiment of a network error detection system configured to use virtual objects.

FIG. 1 is a schematic diagram of an embodiment of a network error detection system 100 configured to use virtual objects to represent network information for performing network error detection. The network error detection system 100 comprises a virtualization device 104 in signal communication with data sources 102A and 102B and a user device 106. In one embodiment, a network error detection system 100 is generally configured such that the virtualization device 104 receives network information 114 and 116 from the data sources 102A and 102B, respectively, and populates data fields in a normalized data structure 118 with the received network information 114 and 116. The network error detection system 100 is further configured to use the normalized data structure 118 to transform the network information 114 and 116 into two-dimensional (2D) or three-dimensional (3D) virtual objects that can be displayed in a virtual reality environment 150 on the user device 106 for network error detection.

Examples of data sources 102A and 102B include, but are not limited to, databases, memories, servers, computing devices, or any other suitable type of device. In FIG. 1, the network error detection system 100 shows two data sources 102A and 102B. In other embodiments, the network error detection system 100 may comprise any other suitable number of data sources in signal communication with the virtualization device 104. Data sources 102A and 102B may be in signal communication with the virtualization device 104 using any suitable type of wired or wireless connection and/or communication protocol. Each data source is configured to send network information and/or any other type of data to the virtualization device 104. In one embodiment, a data source is configured to periodically send data to the virtualization device 104. For example, a data source may be configured to send network information to the virtualization device 104 at predetermined time intervals (e.g. hourly or daily). In other embodiment, a data source is configured to send data in response to a data request from the virtualization device 104.

Data source 102A is configured to send network information 114 to the virtualization device 104. As an example, network information 114 may be a data set that comprises identifiers, Internet Protocol (IP) addresses, External IP address, and headers. Data source 102B is configured to send network information 116 to the virtualization device 104. For example, network information 116 may be a data set that comprises user identifiers, IP addresses, Uniform Resource Locator (URL) or website addresses, and headers. Data sources 102A and 102B may be configured to store different types of data and/or different types of data formats. In FIG. 1, network information 114 and 116 are shown in a table format. In other embodiments, network information 114 and 116 may be any suitable type of data structure and/or format.

Examples of the virtualization device 104 include, but are not limited to, a server, a computer, a laptop, a smart phone, a mobile device, or any other suitable type of computing device. In one embodiment, the virtualization device 104 comprises a normalization engine 108, normalization rules 120, a virtualization engine 110, and virtualization rules 122. Additional information about the virtualization device 104 is described in FIG. 2.

The normalization engine 108 is generally configured to convert network information 114 and 116 into a normalized or standardized format using a normalized data structure 118 and normalization rules 120. A normalized data structure 118 generally comprises a plurality of data fields. Data fields can be linked together to form entries in the normalized data structure 118. For example, rows or columns of the normalized data structure 118 may be defined as entries that link a plurality of data fields. The normalization engine 108 is configured to populate data fields in a normalized data structure 118 with the network information 114 and 116 received from data sources 102A and 102B, respectively. As an example, the normalized data structure 118 may have data fields for user identifiers, internal IP addresses, external IP addresses, URL or website addresses, and headers. In other examples, the normalized data structure 118 may comprise any other type and/or combination of data fields. In FIG. 1, the normalized data structure 118 is shown in a table format. In other embodiments, normalized data structure 118 may be any suitable type of data structure and/or format.

The normalization engine 108 is configured to use normalization rules 120 to populate the normalized data structure 118 with the network information 114 and 116. Normalization rules 120 are configured to map elements from the network information 114 and 116 to data fields in the normalized data structure 118. For example, the normalization rules 120 may link IP address elements in the network information 116 with an Internal IP address data field in the normalized data structure 118. Entries (e.g. rows) in the normalized data structure 118 may be linked with data fields for any combination of elements from data sources 102A and 102B.

The normalization engine 108 is further configured to provide access to the normalized data structure 118 to the virtualization engine 110 to generate virtual objects. For example, the normalization engine 108 may be configured to periodically send the normalized data structure 118 to the virtualization engine 110. As another example, the virtualization engine 110 may be configured to periodically read the normalized data structure 118 from memory.

The virtualization engine 110 is generally configured to use virtualization rules 122 to transform entries in the normalize data structure 118 into virtual objects for a virtual reality environment 150 that can be presented to a user on the user device 106. Virtualization rules 122 are configured to map data fields from the normalized data structure 118 to physical attributes of a virtual object. Virtual objects are computer generated 2D or 3D renderings of physical objects. For example, virtual objects may be vehicles, animals, people, landmarks, products, furniture, walls, roads, lakes, a geographical map, or any other type of physical object. The virtualization engine 110 generates virtual objects as a new type of data structure that links network information with physical attributes of a virtual object. Examples of physical attributes include, but are not limited to, a physical object type, size, color, movement speed, starting location in a virtual reality environment 150, target location in the virtual reality environment 150, and/or any other suitable physical attribute of the virtual object. By generating virtual objects, the virtualization device 104 is able create a virtual reality environment 150 that uses the virtual objects as a new type of data structure to represent relationships between different network information elements as well as how network information elements are affected by or interact with other network information elements.

In one embodiment, the virtualization engine 110 is configured to iteratively identify an entry (e.g. a row) in a normalized data structure 118 and then set physical attributes for a virtual object based on the data field values for the entry in the normalized data structure 118 in accordance with the virtualization rules 122. The virtualization rules 122 is configured to identify data fields in the normalized data structure 118 that are each mapped to physical attributes of a virtual object. Data field values may be used to define a physical object type, size, color, movement speed, starting location in a virtual reality environment 150, target location in the virtual reality environment 150, and/or any other suitable physical attribute of the virtual object.

As an example, the virtualization rules 122 may indicate that the internal IP data field in the normalized data structure 118 is linked with an entity or virtual object type for a boat. The virtualization rules 122 may also indicate that the internal IP data field in the normalized data structure 118 is linked with the physical attribute of a starting location of the virtual object in the virtual reality environment 150. In this example, the virtualization engine 110 uses the virtualization rules 122 to determine and set the starting location based on the data field value in the normalized data structure 118. For instance, the virtualization rules 122 may indicate that IP addresses within the range of 74.0.0.0/24 are set with north lake as the starting location, IP addresses within the range of 75.0.0.0/24 are set with south lake as the starting location, IP addresses within the range of 10.0.0.0/24 are set with east lake as the starting location, and IP addresses within the range of 192.0.0.0/24 are set with west lake as the starting location. The virtualization engine 110 repeats this process for setting any other physical attributes of the virtual object. For example, the virtualization rules 122 may also indicate that the external IP data field in the normalized data structure 118 is linked with the physical attribute of a target location for the virtual object, the user data field in the normalized data structure 118 is linked with the physical attribute of a boat style for the virtual object, and the header data field in the normalized data structure 118 is linked with the physical attribute of a boat color for the virtual object. The virtualization rules 122 may comprise mappings for any number and/or combination of physical attributes of the virtual object. The virtualization engine 110 may repeat this process to generate any number of virtual objects.

The virtualization engine 110 is configured to transmit virtual data 124 defining generated virtual objects for display in a virtual reality environment 150 on the user device 106. For example, the virtual data 124 may comprise code, scripts, instructions, or any other suitable type of information for generating the virtual objects with their physical attributes.

The user device 106 comprises a display 126 configured to present virtual objects in a virtual reality environment 150 to a user. In one embodiment, the user device 106 is configured as a head-mounted wearable device. Other examples of wearable devices are integrated into a contact lens structure, an eye glass structure, a visor structure, a helmet structure, or any other suitable structure. In some embodiments, the user device 106 comprises a mobile user device integrated with the head-mounted wearable device. Examples of mobile user devices include, but are not limited to, a tablet computer, a mobile phone and a smart phone.

Figure 2:
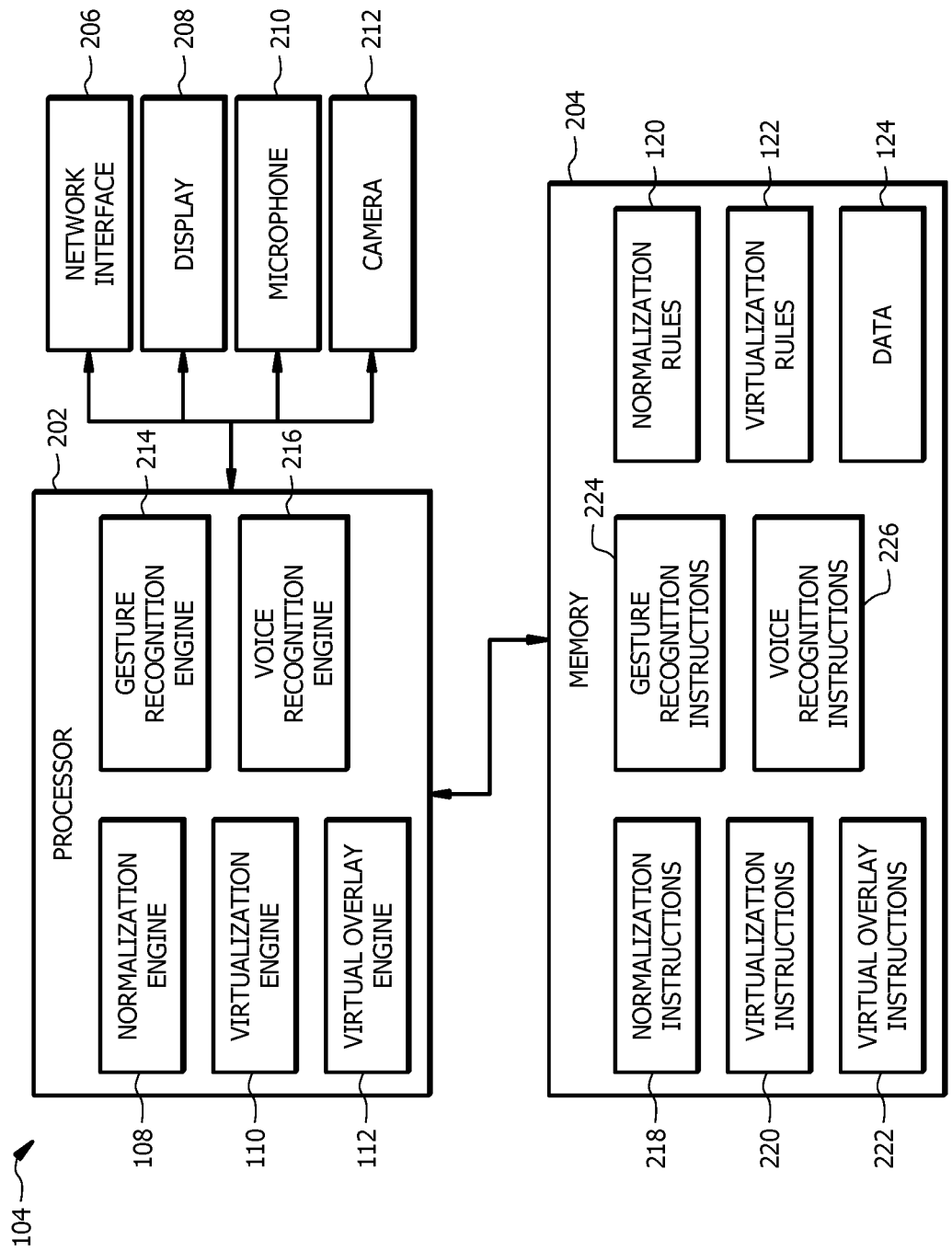
FIG. 2 is a schematic diagram of an embodiment of a virtualization device for a network error detection system.

Additional details about the functionality and components of the user device 106 are described in FIG. 2.

The user device 106 comprises a virtual overlay engine 112 configured to receive the virtual data 124 defining one or more virtual objects and to generate renderings or visual representations of the virtual objects in a virtual reality environment 150. The virtual overlay engine 112 may comprise or employ a compiler, a digital signal processor, or any other suitable hardware or software for transforming virtual data 124 into renderings of virtual objects in a virtual reality environment 150. In one embodiment, the virtual overlay engine 112 is configured to apply laws of physics to virtual objects within the virtual reality environment 150. For example, the virtual overlay engine 112 may create a virtual reality environment that has gravity or prevents virtual objects from simultaneously occupying the same space within the virtual reality environment 150.

As an example, the virtual reality environment 150 may be a geographical map and the virtual objects may be vehicles or other physical objects located in the geographical map. For instance, the virtual reality environment 150 may be a city that comprises landmarks such as a north lake 128, an east lake 130, and a road 132. In this example, a virtual object 134 is represented as a boat. The virtual object 134 has physical attributes set such that a starting location 136 for the virtual object 134 is set as the east lake 130 and a target location 138 for the virtual object 134 is set as the north lake 128. The virtual object 134 is configured to traverse across the virtual reality environment 150 from the start location 136 to the target location 138. For example, the virtual overlay engine 112 may animate the virtual object 134 represented as a boat to move from the east lake 130 to the north lake 128 by using an adjoining river or stream in the virtual reality environment 150. Virtual objects enable the network error detection system 100 to provide a visual representation to a user where they can quickly identify potential issues based on physical attributes of a virtual object. For example, a virtual object (e.g. a boat) may stand out from other virtual objects based on its size, shape, color, etc., which may indicate to a user that there is an issue associated with the network information that was used to generate the virtual object. The user can quickly identify such an issue and request the network information related to the virtual object for further troubleshooting and diagnosing.

In this example, the virtual reality environment 150 generated by the virtual overlay engine 112 also comprises virtual objects 140 represented as cars. These virtual objects 140 are configured to traverse the virtual reality environment 150 along the road 132. The virtual reality environment further comprises virtual object 142 represented by a wall that prevents or blocks the virtual objects 140 from being able to reach their target location. In this example, the wall may be linked with network information for a firewall or port configuration. Using virtual objects 140 and 142 the virtual overlay engine 112 is able to create a visual representation that indicates a potential network error. For instance, the virtual overlay engine 112 is indicating a network error where the current hardware settings represented by the virtual object 142 (i.e. the wall) are blocking data traffic represented by the virtual objects 140 (i.e. the cars) from reaching its target destination. The interaction between virtual objects (e.g. virtual objects 140 and 142) allow relationships between different virtual objects and the network elements they represent to be visualized for network error detection. Once a potential network error has been identified, the virtual objects can be used to recover network information associated with the error to further investigate an issue. In this example, a user can quickly identify an issue (e.g. a bottleneck or data traffic blockage) caused by the wall preventing the flow of data traffic. As explained below, the user can then request the network information associated with the wall to recover the port or firewall settings that are causing an error. This information can be used to resolve the issue and improve the operation of the computer network. As another example, an error may be identified by a virtual object violating laws of physics or when a virtual object exhibits abnormal behavior, for example, a car driving on water. Unlike conventional systems, the network error detection system 100 uses virtual objects and the virtual reality environment to provide a wholistic view of a computer network and to dynamically represent network information in a way that shows how different elements of the network information are related and/or interact with each other.

The virtualization engine 110 is further configured to receive user feedback 125 from the user device 106. The user feedback 125 identifies one or more virtual objects that were selected by a user. For example, in the virtual reality environment 150 described above where virtual objects 140 (i.e. the cars) are unable to reach their target destination because of virtual object 142 (i.e. the wall), the virtualization engine 110 may detect or receive user feedback 125 from a user identifying one or more of virtual objects 140 and 142. The user may select or identify these virtual objects to recover networking information linked with these virtual objects for troubleshooting or diagnosing a potential network error. Examples of techniques for selecting or identifying a virtual object include, but are not limited to, gestures, voice commands, and I/O device (e.g. mouse, touchscreen, or keyboard) actions.

In one embodiment, the user device 106 comprises a camera configured to capture gestures performed by a user. The camera may be configured to work in conjunction with a gesture recognition engine to detect and identify gestures performed by the user. For example, the gesture recognition engine may be configured to detect gestures performed by the user interacting with a virtual object in the virtual reality environment 150 using the camera. Additional information about the camera and the gesture recognition engine are described in FIG. 2. The user device 106 may be configured to use the camera and gesture detection engine to generate and send user feedback 125 that identifies the virtual object selected by the user to the virtualization engine 110.

As an example, the user device 106 may be configured to detect the user repositioning a virtual object anywhere in the virtual reality environment 150 to select the virtual object. As another example, the user device 106 may be configured to detect the user moving a virtual object to a particular area or region 144 in the virtual reality environment 150 to select the virtual object. For instance, the user device 106 may detect a user grasping the virtual object and placing it in a specified region 144. As another example, the user device 106 may be configured to detect a user pressing or tapping a virtual object to select the virtual object. In other examples, the user device 106 may be configured to detect a user stretching, turning, or interacting in any other kind of way with a virtual object to select the virtual object.

In one embodiment, the user device 106 comprises a microphone configured to capture audio signals. The microphone may be configured to work in conjunction with a voice recognition engine to detect voice commands performed by a user. For example, the voice recognition engine may be configured to detect an audio signal identifying a virtual object in the virtual reality environment 150 using the microphone. Additional information about the microphone and the voice recognition engine are described in FIG. 2. The user device 106 may be configured to use the microphone and voice recognition engine to generate and send user feedback 125 that identifies the virtual object selected by the user to the virtualization engine 110.

The virtualization engine 110 is configured to receive user feedback 125 from the user device 106, to identify the physical attributes of the selected virtual object, and to identify the network information linked with the selected virtual objects. For example, the virtualization engine 110 may be configured to identify a virtual object from the user feedback 125 and to identify physical attributes associated with the virtual object. In one embodiment, the virtualization engine 110 may identify the physical attributes of a virtual object based on the virtual data 124 (e.g. code or instructions) used to generate the virtual object. The virtualization engine 110 is further configured to use the virtualization rules 122 and normalized data structure 118 to identify and recover the network information that was used to generate the virtual object and its physical attributes. For example, the virtualization engine 110 is configured to identify data fields and corresponding data field values in the normalized data structure 118 for the identified physical attributes of the selected virtual objects. The virtualization engine 110 may send the recovered network information 146 to the user device 106 for the user. The network information 146 may comprise network information for any number of virtual objects and may be in any suitable format.

As an example, the user device 106 may send user feedback 125 to the virtualization engine 110 that identifies the virtual object 142 (i.e. the wall) that is blocking data traffic. The virtualization engine 110 is configured to identify the virtual object and its physical attributes. In this example, the virtual object 142 may correspond with a firewall and the physical attributes are set based on its settings. The virtualization engine 110 uses the normalized data structure 118 and the virtualization rules 122 to identify the network information related to the firewall and its settings and sends the network information 146 back to the user device 106.

In one embodiment, the virtualization engine 110 is configured to generate an error report 148 that comprises the network information 146 linked with identified virtual object and its physical attributes. For example, the virtualization engine 110 may be configured to troubleshoot the network or system based on the virtual objects identified in the user feedback 125 and sends a summary of the error analysis as an error report 148 to the user device 106. The error report 148 may comprise network information, hardware or software settings, identified errors, troubleshooting instructions or information, and/or any other suitable type of information. The virtualization engine 110 may be configured to send the error report 148 to the user device 106 to be displayed for the user.

In one embodiment, the user device 106 (e.g. the virtual overlay engine 112) is configured to display the network information 146 and/or the error report 148 in on the display 126 for the user. For example, the virtual overlay engine 112 may overlay a portion of the network information 146 and/or error report 148 in the virtual reality environment 150 on the display 126. The recovered network information 146 and/or error report 148 can be used to troubleshoot and resolve any identified issues. This process improves operation of the computer network by removing bottlenecks and/or other issues that degrade the performance of the computer network.

In FIG. 1, the virtualization device 104 and the user device 106 are shown different devices. In another embodiment, the virtualization device 104 and the user device 106 may be integrated within a single device. Additional information about an integrated virtualization device 104 and user device 106 is described in FIG. 2.

FIG. 2 is a schematic diagram of an embodiment of a virtualization device 104 for a network error detection system 100. The virtualization device 104 is configured to transform network information into virtual objects displayed in a virtual reality environment. The virtualization device 104 is configured to generate virtual objects such that the physical attributes of a virtual object are set based on data from the network information. The virtualization device 104 is configured to operate similar to the operation described in FIG. 1.

In one embodiment, the virtualization device 104 comprises a processor 202, a memory 204, network interface 206, a display 126, a microphone 210, and a camera 212. The virtualization device 104 may be configured as shown or in any other suitable configuration. For example, the virtualization device 104 may compromise additional components and/or one or more shown components may be omitted.

The network interface 206 is configured to enable wired and/or wireless communications and to communicate data through a network, system, and/or domain. Examples of the network interface 206 include, but are not limited to, a Bluetooth interface, a radio frequency identifier (RFID) interface, a near-field communication (NFC) interface, a local area network (LAN) interface, a personal area network (PAN) interface, a wide area network (WAN) interface, a Wi-Fi interface, a ZigBee interface, or any other suitable wireless communication interface as would be appreciated by one of ordinary skill in the art upon viewing this disclosure. The network interface 206 is configured to allow the processor 202 to communicate with other devices (e.g. data sources 102A and 102B and user device 106). For example, the network interface 206 is configured to allow the processor 202 to send and receive signals with a user device, a computer, a modem, a switch, a router, a bridge, a server, a client, and/or any other suitable type of device. The network interface 206 is configured to employ any suitable communication protocol.

The display 126 is configured to present visual information to a user using virtual or graphical objects in a virtual reality environment 150 in real-time. In an embodiment, the display 126 is a wearable optical head-mounted display configured to reflect projected images for the user to see. In another embodiment, the display 126 is a wearable head-mounted device comprising one or more graphical display units integrated with the structure of the wear head-mounted device. Examples of configurations for graphical display units include, but are not limited to, a single graphical display unit, a single graphical display unit with a split screen configuration, and a pair of graphical display units. The display 126 may comprise graphical display units, lens, semi-transparent mirrors embedded in an eye glass structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active matric OLED (AMOLED), an organic LED (OLED) display, a projector display, or any other suitable type of display as would be appreciated by one of ordinary skill in the art upon viewing this disclosure. In another embodiment, the graphical display unit is a graphical display on a user device. For example, the graphical display unit may be the display of a tablet or smart phone configured to display virtual or graphical objects in a virtual reality environment 150 in real-time.

Microphone 210 is configured to capture audio signals (e.g. voice commands) from a user. The microphone 210 is configured to capture audio signals continuously, at predetermined intervals, or on-demand. The microphone 210 is operably coupled to the voice recognition engine 216 and provides captured audio signals to the voice recognition engine 216 for processing, for example, to identify a voice command from the user.

Examples of the camera 212 include, but are not limited to, charge-coupled device (CCD) cameras and complementary metal-oxide semiconductor (CMOS) cameras. The camera 212 is configured to capture images or videos of gestures, people, text, and objects within a real environment. The camera 212 is configured to capture images continuously, at predetermined intervals, or on-demand. For example, the camera 212 is configured to continuously capture images to form a video stream of images. The camera 212 is operable coupled to a gesture recognition engine 214 and provides images to the gesture recognition engine 214 for processing, for example, to identify gestures performed by the user.

The processor 202 is implemented as one or more central processing unit (CPU) chips, logic units, cores (e.g. a multi-core processor), field-programmable gate array (FPGAs), application specific integrated circuits (ASICs), or digital signal processors (DSPs). The processor 202 is communicatively coupled to and in signal communication with the memory 204, the network interface 206, the display 126, the microphone 210, and the camera 212. The processor 202 is configured to receive and transmit electrical signals among one or more of the memory 204, the network interface 206, the display 126, the microphone 210, and the camera 212. The electrical signals are used to send and receive data and/or to control or communicate with other devices. For example, the processor 202 transmit electrical signals to operate the camera 212. The processor 202 may be operably coupled to one or more other devices (not shown).

The processor 202 is configured to process data and may be implemented in hardware or software. The processor 202 is configured to implement various instructions. For example, the processor 202 is configured to implement a normalization engine 108, a virtualization engine 110, a virtual overlay engine 112, a gesture recognition engine 214, and a voice recognition engine 216. In an embodiment, the normalization engine 108, the virtualization engine 110, the virtual overlay engine 112, the gesture recognition engine 214, and the voice recognition engine 216 are implemented using logic units, FPGAs, ASICs, DSPs, or any other suitable hardware.

The normalization engine 108 is generally configured to convert data (e.g. network information) from different data sources and/or data in different formats into a normalized or standardized format using normalization rules 120 and a normalized data structure 118. The normalization engine 108 is configured to operate similar to the normalization engine 108 described in FIG. 1.

The virtualization engine 110 is generally configured to use virtualization rules 122 to transform data entries in the normalize data structure 118 into virtual objects for a virtual reality environment 150 that can be presented to a user using user device 106. The virtualization engine 110 is configured to operate similar to the virtualization engine 110 described in FIG. 1.

The virtual overlay engine 112 is configured to present and overlay virtual objects in a virtual reality environment 150 using the display 126. For example, the display 208 may be head-mounted display that allows a user to view virtual objects such as the virtual objects described in FIG. 1. The virtual overlay engine 112 is configured to process data to be presented to a user as virtual objects on the display 126. The virtual overlay engine 112 is configured to operate similar to the virtual overlay engine 112 described in FIG. 1.

The gesture recognition engine 214 is configured to identify gestures performed by a user. Examples of gestures include, but are not limited to, hand movements, hand positions, finger movements, head movements, and/or any other actions that provide a visual signal from a person. For example, gesture recognition engine 214 is configured to identify hand gestures provided by a user to indicate various commands such as a command to select and/or move a virtual object within a virtual reality environment 126. The gesture recognition engine 214 employs any suitable technique for implementing gesture recognition as would be appreciated by one of ordinary skill in the art upon viewing this disclosure.

The voice recognition engine 216 is configured to capture and/or identify voice patterns using the microphone 210. For example, the voice recognition engine 216 is configured to capture a voice signal from a person and to compare the captured voice signal to known voice patterns or commands to identify the person and/or commands provided by the person. For instance, the voice recognition engine 216 is configured to receive a voice signal to authenticate a user and/or to identify a virtual objects and/or actions indicated by the user.

The memory 204 comprise one or more disks, tape drives, or solid-state drives, and may be used as an over-flow data storage device, to store programs when such programs are selected for execution, and to store instructions and data that are read during program execution. The memory 204 may be volatile or non-volatile and may comprise read-only memory (ROM), random-access memory (RAM), ternary content-addressable memory (TCAM), dynamic random-access memory (DRAM), and static random-access memory (SRAM). The memory 204 is operable to store normalization instructions 218, virtualization instructions 220, virtual overlay instructions 222, gesture recognition instructions 224, voice recognition instructions 226, normalization rules 120, virtualization rules 122, data 124, and/or any other type of data or instructions.

Normalization rules 120 are configured to map received data elements (e.g. network information) to data fields in the normalized data structure 118. The normalization rules 120 are configured to operate similar to the normalization rules 120 described in FIG. 1.

Virtualization rules 122 are configured to map data fields from the normalized data structure 118 to physical attributes of a virtual object. The virtualization rules 120 are configured to operate similar to the virtualization rules 120 described in FIG. 1.

Data 124 may comprise data received from data sources (e.g. network information), data associated with virtual objects (e.g. code or instructions for generating virtual objects), the normalized data structure 118, error reports 148, and/or any other suitable type of data.

The normalization instructions 218, the virtualization instructions 220, the virtual overlay instructions 222, the gesture recognition instructions 224, and the voice recognition instructions 226 each comprise any suitable set of instructions, logic, rules, or code operable to execute the normalization engine 108, the virtualization engine 110, the virtual overlay engine 112, the gesture recognition engine 224, and the voice recognition engine 226, respectively.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A network error detection device, comprising:
a network interface configured to receive network information from a plurality of data sources;
a memory configured to store:
virtualization rules configured to map data fields from a normalized data structure to physical attributes of virtual objects within a virtual reality environment, wherein:
the virtual reality environment is a geographical map comprising a landmark; and
the virtualization rules map:
internal IP addresses to a virtual object type and a starting location on the landmark within the virtual reality environment;
external IP addresses to a target location on the landmark within the virtual reality environment; and
hardware settings to virtual objects configured to obstruct the movement of other virtual objects within the virtual reality environment;
a virtualization engine implemented by one or more processors, configured to generate virtual data defining a virtual object for the virtual reality environment, wherein generating the virtual object comprises:
selecting an entry linked with a plurality of data fields in the normalized data structure;
identifying an internal IP address associated with the entry;
determining a virtual object type based on the identified internal IP address, wherein the virtual object type identifies a physical representation of a physical object;
determining a starting location on the landmark within the virtual reality environment based on the identified internal IP address;
identifying an external IP address associated with the entry;
determining a target location on the landmark within the virtual reality environment based on the identified external IP address; and
configuring the virtual object to traverse the landmark within the virtual reality environment from the determined starting location to the target location.

2. The device of claim 1, wherein:
the memory is further configured to store:
normalization rules configured to map received network information to data fields in the normalized data structure; and
further comprising a normalization engine implemented by the one or more processors, configured to populate data fields in the normalized data structure with received network information in accordance with the normalization rules.

3. The device of claim 1, wherein:
the network interface is further configured to:
transmit the virtual data defining the virtual object for display on a user device in response to generating the virtual object;
receive user feedback from the user device, wherein the user feedback identifies a selected virtual object.
the virtualization engine further configured to:
identify physical attributes of the selected virtual object;
identify data fields and corresponding data field values in the normalized data structure for the identified physical attributes of the selected virtual object based on the virtualization rules;
generate an error report comprising at least a portion of the identified data fields values; and
the network interface further configured to send the error report to the user device.

4. The device of claim 1, further comprising the user device, wherein the user device comprises:
a display configured to present virtual objects in the virtual reality environment;
a virtual overlay engine implemented by the one or more processors, configured to:
receive the virtual data defining the virtual object;
render the virtual object in the virtual reality environment on the display;
a camera configured to capture gestures performed by a user; and
a gesture recognition engine configured to:
detect a gesture performed by the user interacting with the virtual object in the virtual reality environment using the camera; and
send the user feedback to the virtualization engine identifying the virtual object as the selected virtual object.

5. The device of claim 4, wherein detecting the gesture performed by the user interacting with the virtual object the virtual environment comprises detecting the user repositioning the virtual object within the virtual reality environment.

6. The device of claim 1, further comprising the user device, wherein the user device comprises:
a display configured to present virtual objects in the virtual reality environment;
a virtual overlay engine implemented by the one or more processors, configured to:

receive the virtual data defining the virtual object;
render the virtual object in the virtual reality environment on the display;
a microphone configured to capture audio signals; and
a voice recognition engine configured to:
detect an audio signal identifying the virtual object in the virtual reality environment using the microphone; and
send the user feedback to the virtualization engine identifying the virtual object as the selected virtual object.

7. The device of claim 1, wherein receiving network information from the plurality of data sources comprises:
receiving a first portion of network information from a first data source in a first format; and
receiving a second portion of the network information from a second data source in a second format, wherein the second format is different than the first format.

8. The device of claim 1, wherein the user device is configured to display at least a portion of the error report in the virtual reality environment.

9. A network error detection method, comprising:
receiving, by a network interface, network information from a plurality of data sources; and
generating, by a virtualization engine, virtual data defining one or more virtual objects for a virtual reality environment using virtualization rules, wherein:
the virtual reality environment is a geographical map comprising a landmark;
the virtualization rules are configured to map data fields from a normalized data structure to physical attributes of virtual objects, wherein the virtualization rules map:
internal IP addresses to a virtual object type and a starting location on the landmark within the virtual reality environment;
external IP addresses to a target location on the landmark within the virtual reality environment; and
hardware settings to virtual objects configured to obstruct the movement of other virtual objects within the virtual reality environment;
and
generating the virtual object comprises:
selecting an entry linked with a plurality of data fields in the normalized data structure;
identifying an internal IP address associated with the entry;
determining a virtual object type based on the identified internal IP address, wherein the virtual object type identifies a physical representation of a physical object;
determining a starting location on the landmark within the virtual reality environment based on the identified internal IP address;
identifying an external IP address associated with the entry;
determining a target location on the landmark within the virtual reality environment based on the identified external IP address; and
configuring the virtual object to traverse the landmark within the virtual reality environment from the determined starting location to the target location.

10. The method of claim 9, further comprising:
populating, by a normalization engine, data fields in a normalized data structure with received network information in accordance with normalization rules, wherein:
the normalized data structure comprising a plurality of data fields; and
the normalization rules are configured to map received network information to data fields in the normalized data structure.

11. The method of claim 9, further comprising:
transmitting, by the network interface, the virtual data defining the virtual object-for display on a user device in response to generating the virtual object;
receiving, by the network interface, user feedback from the user device, wherein the user feedback identifies a selected virtual object;
identifying, by the virtualization engine, physical attributes of the selected virtual object;
identifying, by the virtualization engine, data fields and corresponding data field values in the normalized data structure for the identified physical attributes of the selected virtual object based on the virtualization rules;
generating, by the virtualization engine, an error report comprising at least a portion of the identified data fields values; and
sending, by the network interface, the error report to the user device.

12. The method of claim 9, further comprising:
receiving, by a virtual overlay engine, the virtual data defining the virtual object;
rendering, by the virtual overlay engine, the virtual object in the virtual reality environment on a display;
detecting, by a gesture recognition engine, a gesture performed by the user interacting with the virtual object in the virtual reality environment; and
sending, by the virtual overlay engine, the user feedback to the virtualization engine identifying the virtual object as the selected virtual object.

13. The method of claim 12, wherein detecting the gesture performed by the user interacting with the virtual object in the virtual environment comprises detecting the user repositioning the virtual object within the virtual reality environment.

14. The method of claim 9, further comprising:
receiving, by a virtual overlay engine, the virtual data defining the virtual object;
rendering, by the virtual overlay engine, the virtual object in the virtual reality environment on the display;
detecting, by a voice recognition engine, an audio signal identifying the virtual object in the virtual reality environment; and
sending, by the virtual overlay engine, the user feedback to the virtualization engine identifying the virtual object as the selected virtual object.

15. The method of claim 9, wherein receiving network information from the plurality of data sources comprises:
receiving a first portion of network information from a first data source in a first format; and
receiving a second portion of the network information from a second data source in a second format, wherein the second format is different than the first format.

16. The method of claim 9, further comprising displaying, by the virtual overlay engine, at least a portion of the error report in the virtual reality environment.

17. A network error detection device, comprising:
a network interface configured to receive network information from a plurality of data sources;
a memory configured to store:
- a normalized data structure comprising a plurality of data fields;
- normalization rules configured to map received network information to data fields in the normalized data structure; and
- virtualization rules configured to map data fields from the normalized data structure to physical attributes of virtual objects within virtual reality environment, wherein:
  - the virtual reality environment is a geographical map comprising a landmark;
  - the virtualization rules map:
    - internal IP addresses to a virtual object type and a starting location on the landmark within the virtual reality environment;
    - external IP addresses to a target location on the landmark within the virtual reality environment; and
    - hardware settings to virtual objects configured to obstruct the movement of other virtual objects within the virtual reality environment;

a normalization engine implemented by one or more processors, configured to populate data fields in the normalized data structure with received network information in accordance with the normalization rules;
a virtualization engine implemented by the one or more processors, configured to:
  generate virtual data defining a virtual object for the virtual reality environment, wherein generating the virtual object comprises:
    selecting an entry linked with a plurality of data fields in the normalized data structure;
    identifying an internal IP address associated with the entry;
    determining a virtual object type based on the identified internal IP address, wherein the virtual object type identifies a physical representation of a physical object;
    determining a starting location on the landmark within the virtual reality environment based on the identified internal IP address;
    identifying an external IP address associated with the entry;
    determining a target location on the landmark within the virtual reality environment based on the identified external IP address; and
    configuring the virtual object to traverse the landmark within the virtual reality environment from the determined starting location to the target location.

18. The device of claim 17, further comprising:
a camera configured to capture gestures performed by a user; and
a gesture recognition engine configured to:
  detect a gesture performed by the user interacting with the virtual object in the virtual reality environment using the camera; and
  send the user feedback to the virtualization engine identifying the virtual object as the selected virtual object.

19. The device of claim 18, wherein detecting the gesture performed by the user interacting with the virtual object in the virtual environment comprises detecting the user repositioning the virtual object within the virtual reality environment.

20. The device of claim 18, further comprising:
a virtual overlay engine implemented by the one or more processors, configured to:
  receive the virtual data defining the virtual object;
  render the virtual object in the virtual reality environment on a display; and
  receive user feedback, wherein the user feedback identifies a selected virtual object from among one or more virtual objects;
the virtualization engine further configured to:
  identify physical attributes of the selected virtual object;
  identify data fields and corresponding data field values in the normalized data structure for the identified physical attributes of the selected virtual object based on the virtualization rules;
  generate an error report comprising at least a portion of the identified data fields values; and
the virtual overlay engine further configured to display the error report.

* * * * *